March 9, 1926.

C. E. CORSON ET AL 1,576,135

MECHANISM FOR DRILLING AND APPLYING BRAKE BAND LININGS

Filed March 25, 1922    2 Sheets-Sheet 2

Inventors
Chalon E. Corson
and William A. Wright,
By
Attorneys.

Patented Mar. 9, 1926.

1,576,135

UNITED STATES PATENT OFFICE.

CHALON E. CORSON AND WILLIAM A. WRIGHT, OF PHILADELPHIA, PENNSYLVANIA, ASSIGNORS TO WRIGHT & CORSON COMPANY, OF PHILADELPHIA, PENNSYLVANIA, A CORPORATION OF PENNSYLVANIA.

MECHANISM FOR DRILLING AND APPLYING BRAKE-BAND LININGS.

Application filed March 25, 1922. Serial No. 546,567.

*To all whom it may concern:*

Be it known that we, CHALON E. CORSON and WILLIAM A. WRIGHT, citizens of the United States, and residents of Philadelphia, in the county of Philadelphia and State of Pennsylvania, have jointly invented an Improved Mechanism for Drilling and Applying Brake-Band Linings, of which the following is a specification.

This invention is designed to facilitate the application of linings to brake bands. It is characterized, in the preferred construction and operation, by the use of the brake band as a templet and anvil for a drill having a registering device for positioning the band and lining so that the tool, adapted for boring a counter sunk hole in the lining, will form such hole in registration with the hole in the band, the band and lining being riveted together without separating them between the drilling and riveting operation, with the result that the work is done rapidly and correctly.

Figure 1:
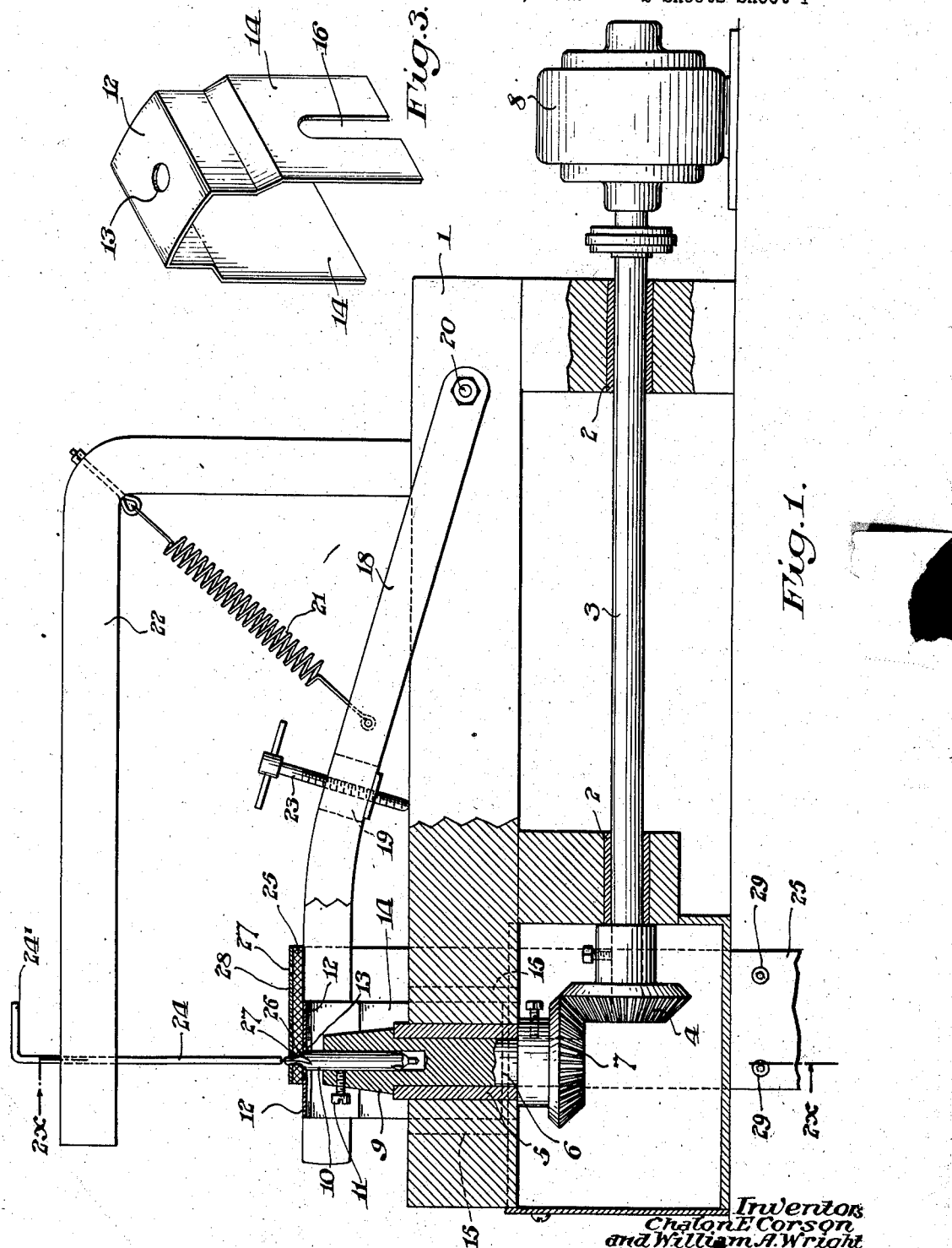
Figure 2:
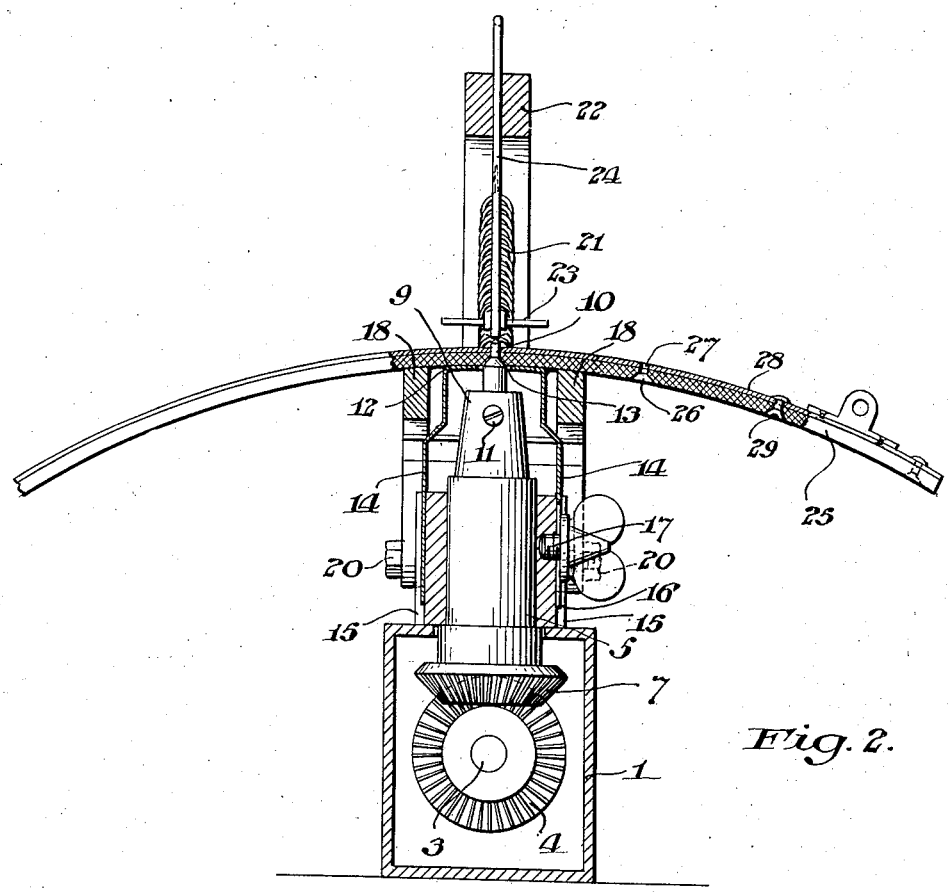
Figure 4:
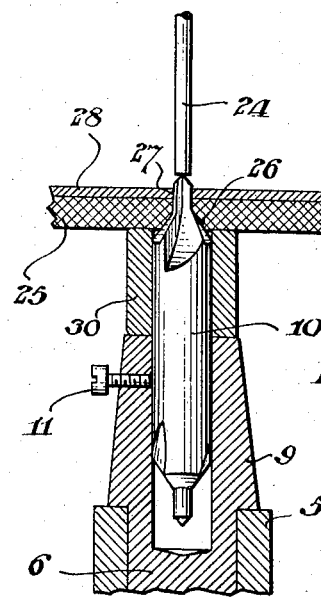

In the accompanying drawings, Fig. 1 is a broken side elevation of drilling mechanism comprised in the invention; Fig. 2 is a sectional view taken on the line 2ˣ—2ˣ of Fig. 1; Fig. 3 is a perspective view of a detached detail of the mechanism, and Fig. 4 is a sectional view taken axially through the drill chuck of a modified construction.

The mechanism illustrated comprises a frame 1 provided with the horizontal bearings 2, in which is journaled the shaft 3 having the beveled gear 4 fixed thereon, and the vertical bearing 5, in which is journaled the spindle 6 having the beveled gear 7 fixed thereon in engagement with the gear 4; the shaft 3 being driven by the motor 8 and driving the spindle 5 through the gears 4 and 7.

The spindle 6 is provided with the tool holder 9 in the socket of which is held the drill bit 10 by the set screw 11, the bit 10 passing through the bearing or work support 12 provided with the aperture 13 therefor. The bearing 12 has the bifurcations or legs 14 which are movable to effect adjustment in the vertical ways 15 of the frame, one of the legs having therein the vertical slot 16 through which passes a screw 17 into the frame to hold the bearing at the desired elevation.

Levers 18, fixed together by a cross piece 19, have the aligned fulcrums 20 carried by the frame and upon which they are adapted to oscillate as an integral construction having bifurcations on opposite sides of the bearing 12. A coiled spring 21 connects this lever mechanism with the elbow arm 22 carried by the frame, whereby the mechanism is elevated, and a screw 23, movable through the member 19, engages the frame to limit the downward movement of the lever mechanism so that the tops of its bifurcations on either side of the bearing 12 shall be approximately level with the top thereof.

A guide rod and position finder 24 is movable freely through the horizontal member of the arm 22 in line with the bit 10 and into contact therewith, the rod having the laterally projecting part 23 at its top for preventing it from falling through the arm or limiting its downward movement and serving as a handle.

The work to be done involves the drilling of the fabric brake band lining 25, so that it shall have counter sunk holes 26 therein registering with the holes 27 in the brake band 28, and the attachment of the lining to the band by the rivets 29 having their heads disposed within the counter sinks.

In carrying out the operation, the lining 25 is placed in the desired final relation to the band 28 and, thus arranged, the lining is placed on the bifurcations of the lever mechanism 18 and over the bearing 12 so that the liner or guide rod 24 will enter the hole 27 in registration with which a hole 26 is to be drilled in the lining. The band and lining with the supporting mechanism 18 now being moved downward, the tool or bit 10 suitably constructed therefor bores a hole 26 through the lining in registration with the hole 27 in the band, the point of the tool passing through the band and elevating the rod 24 in countersinking the hole in the lining, which countersinking is limited by the engagement of the lining with the bearing 12 and the relation of the bit 10 to such bearing.

End holes having been formed in the lining in registration with end holes in the band, rivets are set therein, and with these rivets as an anchorage the lining is stretched in the desired final relation to the band, the further holes required are drilled therein as described and rivets are passed through such holes and the registering holes in the band, where they are upset to secure the parts together.

As illustrated in Fig. 4, the adjustable bearing 12, for limiting the downward movement of the lining and the depth of the countersinks formed therein by the drill bit, may be omitted and a bushing 30 placed on the bit so as to rest on the tool holder 9 and project upwardly so as to limit the downward movement of the lining on the bit, bushings of different heights being used as may be required by the thicknesses of the linings and the depths of the countersinks required.

Having described our invention, we claim:

1. The mechanism for perforating linings in registration with brake band apertures which comprises a work support forming a rest for a lining on a band, a revoluble tool beneath said support, one of said members being fulcrumed and movable toward and from the other, and a guide in alignment with said tool.

2. The mechanism for perforating linings in registration with brake band apertures, which comprises a support forming a rest for a lining on a band, a drilling and countersinking tool beneath said support, one of said members being movable about an axis toward and from the other to effect the drilling and countersinking of a lining on said support, and a guide in alignment with said tool above said support and adapted for registration with a band aperture.

3. The mechanism for perforating linings in registration with apertures of brake bands which comprises a rotary tool, a support forming a rest having bearings on opposite sides of said tool for a lining and band, one of said members being movable toward and from the other to bring the lining into engagement with the tool, and a guide for effecting registration of said tool with a band aperture.

4. In a machine for perforating and countersinking linings in registration with apertures of brake bands, the combination with a revoluble drilling and countersinking tool, of a work support comprising means for varying the depth of penetration of said tool into a lining, said tool projecting through said work support into engagement with a lining thereon, and a guide visibly indicating the position of said tool when concealed by said lining.

5. A machine for drilling and countersinking brake linings in registration with apertures of brake bands comprising a revoluble drilling and countersinking tool and means for visibly indicating the position of said tool when concealed by a lining and band and comprising an indicator normally movable by gravity toward said tool.

6. A machine for drilling and countersinking brake linings in registration with apertures of brake bands comprising a work supporting member, a revoluble drilling and countersinking member, one of said members being pivotally mounted and movable toward and from the other, and guiding means in alignment with said tool to permit registration therewith of a brake band aperture.

7. A machine for drilling and countersinking brake linings in registration with apertures of brake bands comprising a revoluble drilling and countersinking member and a work support comprising a fulcrumed lever for moving a band and lining toward and from said member.

8. A machine for drilling and countersinking brake linings in registration with apertures of brake bands comprising a revoluble drilling and countersinking tool, means visibly indicating the position of said tool when concealed by a lining and band, a bearing through which said tool projects and by which the penetration of a lining by the tool is limited, said bearing and tool being adjustable axially of said tool, and means for maintaining said last named parts in adjusted position.

9. A machine for drilling and countersinking brake linings in registration with apertures of brake bands comprising a frame supporting a revoluble drilling and countersinking tool, means visibly indicating the position of said tool when concealed by a lining and band, and an apertured yoke through which said tool projects, said yoke having a pin and slot connection with said frame.

10. A machine for drilling and countersinking brake linings in registration with apertures of brake bands comprising a frame, a revoluble drilling and countersinking member, a work supporting member, one of said members comprising a lever fulcrumed relatively to said frame, a threaded device having a section interposed between said fulcrumed member and frame for limiting the relative movement of said work support and tool, and a guide indicating the position of said tool.

11. A machine for drilling and countersinking brake linings in registration with apertures of brake bands comprising a revoluble drilling and countersinking tool, a work support comprising a fulcrumed lever, means tending to rock said lever on its fulcrumed and separate said work support and tool, and adjustable means for limiting the movement of said work support toward said tool and limit the penetration of a lining thereby.

12. A machine for drilling and countersinking brake linings in registration with apertures of brake bands comprising a revoluble drilling tool, a work support comprising a spring supported member having a bifurcated end forming arms movable axially of said tool, and an adjustable device carried by said member for limiting the penetration of a lining by said tool.

In testimony whereof we have hereunto set our names this 18th day of January, 1922.

CHALON E. CORSON.
WILLIAM A. WRIGHT.